United States Patent [19]

Vaughn et al.

[11] Patent Number: 4,789,386
[45] Date of Patent: Dec. 6, 1988

[54] METAL IONOMER MEMBRANES FOR GAS SEPARATION

[75] Inventors: Walter L. Vaughn, Lake Jackson, Tex.; Marinda L. Wu, San Ramon, Calif.

[73] Assignee: The Dow Chemical Company, Midland, Mich.

[21] Appl. No.: 908,555

[22] Filed: Sep. 18, 1986

[51] Int. Cl.$^4$ .............................................. B01D 59/10
[52] U.S. Cl. ........................................ 55/16; 55/158; 521/27; 521/149
[58] Field of Search ................................... 55/158, 16

[56] References Cited

U.S. PATENT DOCUMENTS

| | | | |
|---|---|---|---|
| 3,264,272 | 8/1966 | Rees | 260/78.5 |
| 3,322,734 | 5/1967 | Rees | 260/78.5 |
| 3,404,134 | 10/1968 | Rees | 260/78.5 |
| 3,780,496 | 7/1972 | Ward et al. | 55/16 |
| 4,054,707 | 12/1975 | Quentin | 428/213 |
| 4,243,701 | 6/1981 | Riley et al. | 55/158 |
| 4,318,714 | 3/1982 | Kimura et al. | 55/158 |
| 4,551,156 | 11/1985 | Li | 55/16 |
| 4,695,295 | 9/1987 | Dorman et al. | 55/16 |

FOREIGN PATENT DOCUMENTS

86/00819 2/1986 PCT Int'l Appl. .

OTHER PUBLICATIONS

Encyclopedia of Plastics, Polymers, and Resins, vol. 3, 1983, Michael and Irene Ash, Chemical Publishing Company, New York.
DuPont sales brochure, NAFION Perfluorosulfonic Acid Products.

Primary Examiner—Joseph L. Schofer
Assistant Examiner—Bernard Lipman

[57] ABSTRACT

The invention relates to improved gas separation membranes fabricated from a polymer containing a hydrocarbon backbone and pendant metal ionomer groups wherein the pendant metal ionomer groups contain cations of alkali metals, alkaline earth metals, or transition metals bound to pendant $—CO_2^-$. The metal modified membranes result in improved gas selectivities with comparable or improved permeabilities over the unmodified membranes. The membranes may be used to separate gas mixtures such as carbon dioxide and methane or oxygen and nitrogen.

13 Claims, No Drawings

METAL IONOMER MEMBRANES FOR GAS SEPARATION

BACKGROUND OF THE INVENTION

This invention relates to new gas separation membranes fabricated from polymers containing a hydrocarbon backbone and pendant metal ionomer groups. The invention further relates to a method of separating gases using the membranes herein disclosed.

The use of membranes to separate gases is well known in the art. Hydrogen, helium, oxygen, nitrogen, carbon dioxide, methane, and light hydrocarbons are some of the gases which have been separated by membrane processes. Particular applications of interest include obtaining an enriched oxygen stream from air. The enriched oxygen may be used for enhancing combustion or increasing the efficiency of biological fermentation or cell culture processes. Another desirable application is the production of an enriched nitrogen stream from air, which may be used for inert padding of flammable fluids in transit or storage. An enriched nitrogen stream may also be used to increase food storage time. Gas separation by membranes has also been useful in hydrogen recovery and in the separation of carbon dioxide and light hydrocarbons as part of the tertiary oil recovery process.

To separate a gas mixture, the gaseous components are contacted with one side of a semipermeable membrane through which at least one of the gaseous components selectively permeates. A gaseous component which selectively permeates through the membrane passes through the membrane more rapidly than the other component(s) of the mixture. The gas mixture is thereby separated into a portion which is enriched in the selectively permeating component(s) and a portion which is depleted in the selectively permeating component(s). A portion which is depleted in the selectively permeating component(s) is enriched in the nonpermeating component(s). A non-permeating component permeates more slowly through the membrane than the other component(s). The membrane material is chosen so that some degree of separation of the gaseous mixture can be obtained.

Membranes have been fabricated from a wide variety of polymeric materials. An ideal gas separation membrane possesses a high separation factor, high gas permeability, and good mechanical properties. Polymers possessing high selectivities generally have undesirably low permeabilities. Those polymers having high permeabilities generally have low separation factors. In the past, a choice between a high gas permeability and a high separation factor has been required. There is a need to develop a membrane which overcomes the necessity of choosing between a high selectivity and a high gas permeability.

SUMMARY OF THE INVENTION

The invention relates to new membranes for gas separation which are fabricated from polymers containing a hydrocarbon backbone and pendant metal ionomer groups, wherein the pendant metal ionomer groups are comprised of cations of alkali metals, alkaline earth metals, or transition metals bound to $-CO_2^-$.

The present invention further relates to a method of separating gases comprising (1) contacting a feed gas mixture under pressure with one side of the semipermeable membrane hereinbefore described, (2) maintaining a pressure differential across the semipermeable membrane under conditions such that at least one of the component(s) of the feed gas mixture selectively permeates through the membrane from the high pressure side to the low pressure side of the membrane, (3) removing the permeated gas which is enriched in the faster permeating component(s) from the low pressure side of the membrane, and (4) removing the nonpermeated gas which is depleted in the faster permeating component(s) from the high pressure side of the membrane.

The invention uses membranes which possess high gas selectivities to separate oxygen and nitrogen, carbon dioxide and methane, and other gas mixtures while maintaining reasonable gas permeabilities. The membranes useful in the invention also possess good mechanical properties.

DETAILED DESCRIPTION OF THE INVENTION

The membranes relating to this invention are fabricated from polymers containing a hydrocarbon backbone and pendant metal ionomer groups. A polymer with a hydrocarbon backbone refers to polymers which contain carbon and hydrogen in the main chain. A pendant metal ionomer group as used herein refers to a metal cation which is bound to pendant $-CO_2^-$, that is, $-CO_2^-$ which is attached directly or indirectly to the main polymer chain. The polymers are formed by the polymerization of unsaturated monomers containing pendant carboxylic acid or ester functionalities, or by the copolymerization of such monomers with alpha-olefins or vinyl monomers, wherein the pendant carboxylic acid or ester functionalities have been converted to metal ionomer form. Such polymers include interpolymers, which are mixed polymers formed by the polymerization of two or more different types of monomer units. Interpolymers include copolymers, terpolymers, etc.

The invention includes membranes comprised of random and non-random polymers containing units described by formula (1):

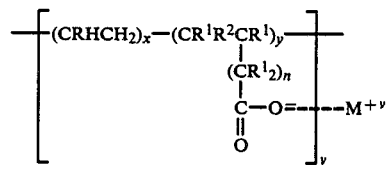

wherein

M is an alkali metal, alkaline earth metal, or a transition metal;

v refers to the valence of the metal cation v is 1, 2, or 3. That is, the metal cation may be monovalent, divalent, or trivalent. Where $v=1$, one pendant $-CO_2^-$ functionality is coordinated with the monovalent metal cation; where $v=2$, two pendant $-CO_2^-$ functionalities are coordinated with the divalent metal cation; where $v=3$, three pendant $-CO_2^-$ functionalities are coordinated with the trivalent metal cation;

x is individually in each occurrence a variable integer from about 10 to about 40;

y is individually in each occurrence a variable integer from about 1 to about 10;

R is individually in each occurrence hydrogen, alkyl, ester, nitrile, acetate, amide, anhydride, or aryl;

$R^1$ is individually in each occurrence hydrogen, alkyl, or aryl;

$R^2$ is individually in each occurrence hydrogen, alkyl, aryl, or a pendant carboxylic acid or ester group of the formula $-(CR^1{}_2)_nCO_2R^3$ wherein $R^1$ is as hereinbefore defined and $R^3$ is hydrogen, alkyl, or aryl;

n is individually in each occurrence a variable integer from 0 to about 6.

Preferred metal ionomer forms are cations of alkali metals (group IA metals), alkaline earth metals (group IIA metals), or transition metals bound to pendant $-CO_2{}^-$. In formula (1) above, M preferably is a group IA (alkali) metal, a group IIA (alkaline earth) metal, a group IIIA metal, a group IB through VIIB metal, or a group VIII metal of the first, second, or third row. More preferably, M is Li, Na, K, Rb, Cs, Fr, Be, Mg, Ca, Sr, Ba, Ra, Al, Cu, Zn, Cr, Fe, Mn, Co, Pb, or Ni. Most preferably, M is Na, K, Cs, Mg, Ca, Ba, Al, Cu, Zn, Cr, Mn, Fe, Co, Pb, or Ni.

In formula (1), x is preferably an integer of from about 15 to about 25. y is preferably an integer of from about 1 to about 6, more preferably from about 1 to about 2. R is preferably hydrogen, an inertly substituted or unsubstituted $C_{1-18}$ alkyl, ester, nitrile, acetate, amide, anhydride, or an inertly substituted or unsubstituted $C_{6-18}$ aryl; more preferably R is hydrogen, an inertly substituted or unsubstituted Chd 1-10 alkyl, or an inertly substituted or unsubstituted $C_{6-18}$ arylalkyl. $R^1$ is preferably hydrogen, an inertly substituted or unsubstituted $C_{1-18}$ alkyl, or an inertly substituted or unsubstituted $C_{6-18}$ aryl; more preferably, $R^1$ is hydrogen, an inertly substituted or unsubstituted $C_{1-10}$ alkyl, or an inertly substituted or unsubstituted $C_{6-18}$ arylalkyl. $R^2$ is preferably hydrogen, an inertly substituted or unsubstituted $C_{1-12}$ alkyl, an inertly substituted or unsubstituted $C_{6-18}$ aryl, or a pendant group of the formula $-(CR^1{}_2)_nCO_2R^3$. $R^3$ is preferably hydrogen, a $C_{1-8}$ alkyl, or a $C_{6-12}$ arylalkyl. n is preferably an integer from 0 to about 6; more preferably n is an integer from 0 to about 2. An inertly substituted group refers to a group which has replaced a hydrogen in the aryl or alkyl and is unreactive under the conditions of fabrication and use. Examples of preferred inert substituents include methyl, ethyl, propyl, and the like.

Polymers of interest in the present invention should have adequate mechanical strength under fabrication and use conditions, acceptable viscosity range for processing, and other properties desirable for membrane formation and use.

Examples of preferred polymers for conversion to metal ionomer form include poly(acrylic acid), poly(methacrylic acid), poly(methyl acrylate), poly(methyl methacrylate), and the like. Examples of preferred alpha-olefin copolymers include copolymers of alpha-olefins, preferably ethylene, with acrylic acid, methacrylic acid, ethacrylic acid, fumaric acid, maleic acid, itaconic acid, crotonic acid, isocrotonic acid, cinnamic acid, maleic anhydride, methyl acrylate, methyl methacrylate, ethyl acrylate, and the like. Examples of preferred acrylic acid or methacrylic acid copolymers include copolymers of acrylic acid or methacrylic acid with methyl acrylate, ethyl acrylate, isobutyl acrylate, methyl methacrylate, acrylamide, vinyl acetate, acrylonitrile, styrene, alpha-methylstyrene, maleic anhydride, and the like. Examples of preferred terpolymers include ethylene/ acrylic acid/styrene, ethylene/acrylic acid/methyl methacrylate, ethylene/acrylic acid/vinyl acetate, ethylene/methacrylic acid/acrylonitrile, acrylic acid/methacrylic acid/ acrylamide, acrylic acid/vinyl acetate/methacrylic acid, acrylic acid/acrylamide/maleic acid, acrylic acid/vinyl acetate/maleic acid, ethylene/acrylic acid/isobutyl acrylate, ethylene/acrylic acid/maleic anhydride, and the like.

Processes used to produce the unexchanged polymers are described in the art. Numerous polymers containing pendant carboxylic acid or ester functionalities are readily obtainable. See *Encyclopedia of Polymer Science and Technology*, John Wiley and Sons, 1964; *Encyclopedia of Chemical Technology*, John Wiley and Sons, 1978; and Ferdinand Rodriguez, *Principles of Polymer Systems*, 2nd edition, Hemisphere Publishing Company, McGraw-Hill, New York, 1982; incorporated herein by reference. Free radical high pressure polymerization is a preferred process for formation of random interpolymers.

The polymers are formed by the polymerization of unsaturated monomers which contain pendant carboxylic acid or ester functionalities represented by formula (2), or by the copolymerization of monomers of formula (2) with alpha-olefins or vinyl monomers of formula (3).

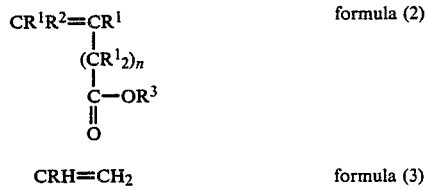

wherein R, $R^1$, $R^2$, $R^3$, and n are as hereinbefore defined.

Examples of preferred unsaturated monomers containing pendant carboxylic acid or ester functionalities include acrylic acid, methacrylic acid, ethacrylic acid, crotonic acid, isocrotonic acid, cinnamic acid, maleic acid, fumaric acid, maleic anhydride, methyl acrylate, methyl methacrylate, ethyl acrylate, and the like.

Examples of preferred alpha-olefins or vinyl monomers include ethylene, propylene, butene-1, pentene-1, hexene-1, heptene-1, 3-methylbutene-1, 2-methylpentene-1, 4-methylpentene-1, vinylcyclohexane, styrene, alpha-methylstyrene, methyl acrylate, methyl methacrylate, ethyl acrylate, isobutyl acrylate, vinyl acetate, acrylonitrile, acrylamide, maleic anhydride, and the like.

The polymers containing pendant carboxylic acid or ester functionalities hereinbefore described may be converted to the metal ionomer form prior to membrane formation. The metal ionomer form of the polymer may be obtained by mixing an aqueous dispersion of the polymer with an aqueous metal salt solution of an alkali metal, an alkaline earth metal, or a transition metal. The metal salt solution may contain a plurality of different metal ions, which results in the ionomer form of the polymer containing a mixture of metal cations. Preferred metal salts which may be used in this invention are metal sulfates, metal nitrates, metal acetates, metal halides, and the like. Solutions of metal salts which have concentrations up to the solubility limit of the metal salts may be used. The aqueous polymer solution preferably contains from about 1 to 40 wt% solids, more preferably from about 2 to 35 wt% solids. The concentration of the metal salt solution is preferably from about 0.5 to 40 wt%, more preferably from about 0.5 to 30 wt%, most preferably from about 0.5 to 25 wt%. Preferred temperatures range from about 10 degrees to 65 degrees C., more preferably from about 15 degrees to 40 degrees C. Mixing times should be long enough to obtain a uniform product. Preferred mixing times range from about 0.5 to 300 minutes, more preferably from about 0.5 to 100 min. The mixture is then contacted with sulfuric, hydrochloric, or nitric acid of preferably about 0.1 to 2 N, more preferably from about 0.1 to 1 N to adjust the pH of the solution and precipitate the ionomer form of the polymer. The solids are recovered by filtration, washed, and dried.

The cation of the appropriate metal salt is exchanged with the hydrogen or $R^3$ in the pendant carboxylic acid or ester group of the polymer. The hydrogen or $R^3$ in the available carboxylic acid or ester groups may be wholly or only partially exchanged with metal ions. The degree of metal ion exchange need only be sufficient to impart the desired gas separation performance in the fabricated membrane. Preferred metal contents range from about 0.3 to 40 wt%, with 2 to 25 wt% metal content being more preferred.

Partial exchange may be desirable in cases where the melt index of the polymer decreases dramatically with increasing ionomer content, making extrusion of the ionomer form into films or fibers difficult. Generally, polymers having a melt index below about 0.1 are compression molded rather than extruded. Operable compression molding temperatures include temperatures which are sufficient to soften the polymer and enable formation of membranes at reasonable pressures and below the degradation point of the polymer being fabricated. Preferred compression molding temperatures range from about 150 degrees C. to about 400 degrees C., more preferably from about 150 degrees C. to about 350 degrees C. Optionally compression molding under nitrogen reduces the oxidative crosslinking of the polymer powder. If the metal ionomer content in the polymer is sufficiently low so that the melt index is high, the ionomer form of the polymer may be extruded into films or hollow fibers by conventional methods. Preferably the melt index of the polymer is between about 0.1 and about 100 for extrusion. Extrusion temperatures preferably range from about 150 degrees C. to about 350 degrees C., more preferably from about 165 degrees C. to about 325 degrees C.

More preferred species of polymers for use in the present invention include the metal ionomer forms of copolymers of ethylene/acrylic acid, ethylene/methacrylic acid, ethylene/maleic anhydride, styrene/acrylic acid, styrene/methacylic acid, and styrene/maleic anhydride. Most preferred species of polymers for use in the present invention include metal ionomer forms of copolymers of ethylene/acrylic acid (EAA) and ethylene/methacrylic acid (EMAA). The processes used to produce such copolymers are well known and described by several U.S. Pat. Nos., including 3,520,861; 3,658,741; 3,736,305; 3,884,857; 3,988,509; 4,248,990; 4,252,924; 4,351,931; incorporated herein by reference.

Ethylene/carboxylic acid copolymers may be converted to the metal ionomer form by the process outlined above. Other processes for obtaining metal ionomer forms of ethylene/carboxylic acid copolymers such as EAA and EMAA are described in U.S. Pat. Nos. 3,264,272; 3,322,734; 3,404,134; and *Ionic Polymers*, L. Holliday, editor, John Wiley and Sons, New York, 1975, pp. 72-75, incorporated herein by reference. The metal exchange reaction may occur in the melt during extrusion of an ethylene/carboxylic acid copolymer with a cation-forming compound. The cation-forming compound may also be added to the polymerization reactor of the ethylene/carboxylic acid copolymer while the copolymer is in the molten state or in solution. An EAA or EMAA copolymer containing any degree of acid content which can be produced is suitable for conversion into the metal ionomer form. Preferred acid contents range up to about 45 wt%, more preferred acid contents range from about 2 wt% to about 20 wt%. Compression molding of EAA and EMAA metal ionomers may be accomplished at any temperature which is sufficient to soften the polymer and enable formation of a membrane at a reasonable pressure and below the degradation point of the polymer. Compression molding of EAA and EMAA metal ionomers is preferably accomplished at temperatures above about 150 degrees C. and below about 400 degrees C. More preferably compression molding of EAA and EMAA ionomers is carried out between about 150 degrees C. and 350 degrees C. The EAA and EMAA metal ionomers may be extruded provided the melt index is sufficiently high. Preferably the melt index of the polymer is above about 0.1 and below about 100 for extrusion into film or hollow fibers. Preferably extrusion temperatures range from about 165 degrees C. to about 265 degrees C.

Alternatively, the polymer may be converted into the metal ionomer form after membrane formation. This route takes advantage of the generally greater processing flexibility of the unmodified polymer over the metal exchanged polymer. Polymers containing pendant carboxylic acid or ester functionalities may be formed into films or hollow fibers by several methods known to one skilled in the art, including compression molding, blow molding, film or fiber extrusion, or coating from aqueous dispersions onto a support. Conventional fabrication equipment can be used. Fabrication temperatures vary depending upon the melt index of the polymer. The membranes formed by these techniques may be homogeneous, asymmetric, or composite.

Such membranes may also be obtained by solution casting from suitable solvents. Such a technique is known to one skilled in the art. See Kesting, Robert, *Synthetic Polymer Membranes*, 2nd edition, John Wiley and Sons, New York, 1985, incorporated herein by reference.

Composites may be obtained by coating the polymer from solutions or aqueous dispersions onto supporting film or hollow fibers. The substrate may be porous or nonporous; preferably the substrate is porous so that the substrate presents minimal resistance to gas transport through the composite membrane. Conventional coating and lamination techniques may be adapted for use in fabrication of such membranes. Any polymeric material to which the polymer will adhere, which possesses sufficient mechanical properties under membrane use conditions, and which does not unduly interfere with gas transport through the composite membrane may be used as a substrate for the composite membrane. The surface of the substrate may be pretreated to enhance adhesion, such as through surface oxidation by corona discharge. Examples of preferred substrate materials for composite membranes include cellulosics (ethyl cellulose, cellulose acetate, cellulose diacetate, cellulose triacetate, cellulose nitrate, cellulose propionate, cellulose acetate butyrate, and the like), ethylene vinyl acetate, polyamides, polyolefins, polyesters, polyurethanes, polysulfones, polyethersulfones, and the like.

Once the membrane is formed, the membrane is converted to the metal ionomer form. The fabricated membrane is swollen in hot dilute caustic (sodium hydroxide), lithium hydroxide, or potassium hydroxide. Preferred caustic treatment conditions include soaking in about 0.4 to 2 N NaOH for about 30 to 120 minutes at about 50 degrees to 70 degrees C. After rinsing with water, the membrane is contacted with an aqueous metal salt solution of about 0.5 to 40 wt% metal salt, more preferably from about 0.5 to 30 wt% metal salt, most preferably from about 0.5 to 25 wt% metal salt. Preferred metal salt treatment times are about 0.5 minutes to about 600 minutes at temperatures of about 10 degrees C. to about 65 degrees C. The membrane is then rinsed with water before drying. The hydrogen or $R^3$ in the carboxylic acid or ester groups is thus partially or fully exchanged with the appropriate metal cations. The surface layer of the metal ionomer membrane may be further densified by flame polishing or by other techniques known in the art.

EAA is an especially preferred copolymer for use in the present invention. Fabrication techniques for EAA films and fibers are well known. EAA can be processed using conventional polyethylene film or fiber fabrication equipment. Fabrication temperatures vary depending upon the melt index and the acrylic acid content of the copolymer. Blown film from EAA copolymers is preferably obtained by processing at temperatures from about 80 degrees C. to about 280 degrees C., more preferably from about 90 degrees C. to about 240 degrees C. Cast film preferably is obtained by processing at temperatures from about 110 degrees C. to about 280 degrees C., more preferably from about 150 degrees C. to about 240 degrees C. Chill roll temperatures are preferably about 0 degrees C. to about 25 degrees C. EAA hollow fibers are preferably extruded at temperatures of about 120 degrees C. to about 225 degrees C., more preferably from about 135 degrees C. to about 210 degrees C.

EAA membranes may also be obtained by solution casting from suitable solvents. Such a technique is known to one skilled in the art. Preferred solvents for EAA copolymers include mixtures of tetrahydrofuran/toluene and mixtures of isopropanol/perchloroethylene/toluene. See U.S. Pat. Nos. 3,554,957; 4,279,797; 4,296,019; incorporated herein by reference.

EAA composites may be obtained by coating EAA from solutions or aqueous dispersions onto supporting film or fibers as hereinbefore described. See U.S. Pat. No. 4,173,669; incorporated herein by reference. To form suitable coatings from aqueous dispersions of EAA, moderately elevated temperatures are preferred. The temperature used preferably should be sufficiently below the temperature at which the substrate integrity is adversely affected. More preferred are temperatures of above about 25 degrees C. and below about 70 degrees C.

The membranes used in the invention are relatively thin. The thickness of such membranes is preferably greater than about 10 microns and less than about 750 microns. More preferably, the membrane thickness is between about 25 and about 350 microns.

The metal modified membranes are sealingly engaged in a pressure vessel. The membrane surface separates the vessel into two fluid regions wherein fluid flow between the two regions is accomplished by fluid permeating through the membrane. A variety of different device configurations can be fabricated. The membranes may be incorporated into plate & frame, spiral, or hollow fiber devices. Methods of fabricating such devices and different design configurations are described in the art. See U.S. Pat. Nos. 3,228,876; 3,422,008; 3,455,460; 3,475,331; 3,526,001; 3,528,553; 3,690,465; 3,702,658; 3,755,034; 3,801,401; 4,271,900; 3,872,014; 3,966,616; 4,045,851; 4,061,574; 4,080,296; 4,083,780; 4,220,535; 4,235,723; 4,265,763; 4,315,819; 4,430,219; 4,351,092; and 4,367,139; incorporated herein by reference.

The invention is used to separate oxygen and nitrogen, carbon dioxide and methane, and other gas mixtures. One side of the membrane is contacted with the feed gas mixture under pressure, while a pressure differential is maintained across the membrane. In the case where the membrane is a hollow fiber, the feed gas mixture may be introduced either down the bore of the hollow fiber or on the outside of the hollow fiber. At least one of the components in the gas mixture selectively permeates through the membrane. The component(s) of the feed gas which selectively permeates through the membrane passes through the membrane from the high pressure side to the low pressure side of the membrane such that a stream is obtained on the low pressure side of the membrane which is enriched in the faster permeating gas. The permeated gas is removed from the low pressure (downstream) side of the membrane. A stream depleted in the faster permeating gas is withdrawn from the high pressure (upstream) side of the membrane. In the case where oxygen is separated from nitrogen, oxygen selectively permeates through the membrane and the pressure differential across the membrane is preferably between about 50 and 250 psi. For the separation of carbon dioxide and methane, carbon dioxide selectively permeates through the membrane and the pressure differential across the membrane is preferably between about 50 and 850 psi. The separation may be accomplished at temperatures and pressures which do not adversely affect membrane integrity or performance. For such gas separations, temperatures between about 0 degrees C. and about 150 degrees C. are usualyy preferred. Gas permeability is defined as $$P = \frac{(\text{amount of permeant})(\text{membrane thickness})}{(\text{area})(\text{time})(\text{driving force gradient across the membrane})}.$$

A standard permeability measurement unit $$\frac{cm^3 \ (STP) \ cm}{cm^2 \ s \ cmHg}.$$

The separation factor, $\alpha$, is the ratio of the permeability of the faster permeating gas to the permeability of the slower permeating gas.

The metal ionomer form of the membrane preferably has an oxygen permeability of about $1.0 \times 10^{-10}$ cm$^3$(STP) cm/(cm$^2$ s cmHg) or greater, more preferably of about $2.0 \times 10^{-10}$ cm$^3$(STP) cm/(cm$^2$ s cmHg) or greater. The membrane has a separation factor for oxygen/nitrogen preferably of about 3.0 or greater, more preferably of about 5.0 or greater. The membrane preferably has a permeability for carbon dioxide of about $7.0 \times 10(-10)$ cm$^3$(STP) cm/ (cm$^2$s cmHg) or greater, more preferably of about $8.5 \times 10(-10)$ cm$^3$(STP) cm/(cm$^2$ s cmHg) or greater. The separation factor for carbon dioxide/ methane is preferably about 6.0 or greater, more preferably about 8.0 or greater.

SPECIFIC EMBODIMENTS

The following examples are presented to illustrate the invention only and are not intended to limit the scope of the invention or claims. Percentages are by weight unless otherwise indicated. The gas separation properties of the membranes are measured using a constant volume-variable pressure gas permeation apparatus or a constant pressure-variable volume gas permeation apparatus. Literature sources describe such apparatus and measurement techniques. See *Methods of Experimental Physics*, Vol. 16c, Academic Press, Inc., 1980, pp. 315-377; Pye, Hoehn, and Panar, "Measurement of Gas Permeability of Polymers. I. Permeabilities in Constant Volume/Variable Pressure Apparatus", *Journal of Applied Polymer Science*, Vol. 20, 1976, pp. 1921-1931; and Pye, Hoehn, and Panar, "Measurement of Gas Permeability of Polymers. II. Apparatus for Determination of Permeabilities of Mixed Gases and Vapors," *Journal of Applied Polymer Science*, Vol. 20, 1976, pp. 287-301. The membrane sample size is 3.9 cm or 11.0 cm in diameter. Permeability values are determined at about 25 degrees C. with a 50 psi pressure differential across the membrane. Reported selectivities are based on single gas permeability measurements.

EXAMPLE 1

800 ml of deionized water is added to 800 ml aqueous dispersion of PRIMACOR* 4983 resin (25% EAA solids, consisting of a copolymer of 80% ethylene and 20% acrylic acid) (*trademark of The Dow Chemical Company) and mixed in a one gallon reactor to obtain a solids dispersion at a pH of 9. 200 ml of a 0.5% CuSO$_4$ solution is added slowly to the vessel while mixing for about 30 seconds. 200 ml of 1.0 N sulfuric acid is added with mixing for about 30 seconds, with a resulting pH of about 3. The solids are recovered by filtration onto a Whatman No. 1 filter paper fitted to a large Buchner funnel with a suction flask. To purify the solids, the filter cake thus obtained is resuspended as a slurry in 1500 ml of deionized water. The solids are again recovered by filtration. The damp filter cake is air dried for at least 24 hours before sieving to 20–30 mesh size. The sieved ionomer is then dried at 55 degrees C. for 24 hours in a drying oven.

Samples representing 25% and 50% conversion of the acrylic acid groups to the metal ionomer form are obtained. The ionomers are compression molded into films at 10,000 psi and 160 degrees C. Gas permeability measurements are made for oxygen, nitrogen, carbon dioxide, and methane. See Tables I and II.

The oxygen/nitrogen selectivities for the copper modified membranes are increased by about 100% over that for the unmodified EAA membranes. The carbon dioxide/methane selectivities for the copper modified membranes are increased by about 20% over that for the unmodified EAA membranes.

TABLE I

Example 1
Oxygen and Nitrogen Permeabilities $$10(-10) \frac{cm^3 \text{ (STP) cm}}{cm^2 \text{ sec cmHg}}$$

| Sample | % AA | % Cu | O$_2$ | N$_2$ | O$_2$/N$_2$ |
|---|---|---|---|---|---|
| A | 20.0* | 0.0 | 1.61 | 0.683 | 2.4 |
| B | 10 | 4.0 | 1.97 | 0.392 | 5.0 |
| C | 10 | 4.0 | 1.90 | 0.414 | 4.6 |
| D | 10 | 4.0 | 1.92 | 0.400 | 4.8 |

*80% ethylene/20% acrylic acid copolymer

TABLE II

Example 1
Carbon Dioxide and Methane Permeabilities $$10(-10) \frac{cm^3 \text{ (STP) cm}}{cm^2 \text{ sec cmHg}}$$

| Sample | % AA | % Cu | CO$_2$ | CH$_4$ | CO$_2$/CH$_4$ |
|---|---|---|---|---|---|
| A | 20.0* | 0.0 | 6.75 | 1.10 | 6.1 |
| B | 15.0 | 1.9 | 7.67 | ** | — |
| C | 15.0 | 1.9 | 7.28 | ** | — |
| D | 10.0 | 4.0 | 8.73 | 1.15 | 7.6 |
| E | 10.0 | 4.0 | 8.20 | 1.13 | 7.3 |

*80% ethylene/20% acrylic acid copolymer
**Gas permeability below lower detection limit of apparatus (ie < .8)

EXAMPLE 2

Using the general method described in Example 1, the ionomers listed in Table III are prepared from the base polymer PRIMACOR* 5980 (80% ethylene/20% acrylic acid copolymer) (*trademark of The Dow Chemical Company). The ionomer powders are vacuum dried at 40 degrees C. for 24 hours. The ionomer powders are melted prior to pressing into films at about 350 degrees C. to 450 degrees C. at about 10,000 to 20,000 psig. Gas permeability measurements are made for oxygen, nitrogen, carbon dioxide, methane, and helium. See Tables IV and V.

TABLE III

Example 2
Metal Ionomers Derived From PRIMACOR* 5980 Resin

| Ionomer | Wt % Metal | % Conversion[1] |
|---|---|---|
| Iron | 1.6 | 31.7 |
| Zinc | 2.2 | 25.0 |
| Magnesium | 1.0 | 30.1 |
| Lead | 17.0 | 71.2 |
| Aluminum | 0.37 | 14.5 |

[1]% Conversion represents conversion of the acrylic acid groups to the metal ionomer form.

TABLE IV

Example 2
Gas Permeabilities $$10(-10) \frac{cm^3 \text{ (STP) cm}}{cm^2 \text{ sec cmHg}}$$

| Ionomer | O$_2$ | N$_2$ | CO$_2$ | CH$_4$ | He |
|---|---|---|---|---|---|
| Iron | 1.71 | 0.472 | 7.62 | 1.08 | 7.34 |
| Zinc | 1.98 | 0.746 | 8.27 | 1.03 | 8.15 |
| Magnesium | 2.79 | 0.845 | 11.5 | 1.91 | 10.9 |
| Lead | 1.84 | 0.666 | 6.77 | 1.14 | 7.96 |
| Aluminum | 2.99 | 0.770 | 11.4 | 1.84 | 12.1 |

TABLE IV-continued
Example 2
Gas Permeabilities $$10(-10) \frac{cm^3 \text{ (STP) cm}}{cm^2 \text{ sec cmHg}}$$

| Ionomer | $O_2$ | $N_2$ | $CO_2$ | $CH_4$ | He |
|---|---|---|---|---|---|
| EAA* | 1.61 | 0.683 | 6.75 | 1.10 | — |

*Unexchanged polymer, 80% ethylene/20% acrylic acid

TABLE V
Example 2
Gas Selectivities[1]

| Ionomer | $O_2/N_2$ | $CO_2/CH_4$ |
|---|---|---|
| Iron | 3.6 | 7.0 |
| Zinc | 2.7 | 8.1 |
| Magnesium | 3.3 | 6.0 |
| Lead | 2.8 | 5.9 |
| Aluminum | 3.9 | 6.2 |
| EAA[2] | 2.4 | 6.1 |

[1] Based on single gas permeabilities
[2] Unexchanged polymer, 80% ethylene/20% acrylic acid

What is claimed is:

1. A method of separating gases comprising
   (a) contacting with a feed gas mixture under pressure one side of a semipermeable membrane fabricated from a polymer containing a hydrocarbon backbone and pendant metal ionomer groups, wherein the pendant metal ionomer groups are comprised of cations of alkali metals, alkaline earth metals, or transition metals bound to pendant $-CO_2^-$;
   (b) maintaining a pressure differential across the membrane under conditions such that at least one of the component(s) of the feed gas mixture selectively permeates through the membrane from the high pressure side to the low pressure side of the membrane;
   (c) removing the permeated gas which is enriched in the faster permeating component(s) from the low pressure side of the membrane; and
   (d) removing the nonpermeated gas which is depleted in the faster permeating component(s) from the high pressure side of the membrane.

2. The method of claim 1 wherein the membrane is fabricated from polymers containing units in the backbone described by the formula:

$$\left[ (CRHCH_2)_x - (CR^1R^2CR^1)_y \begin{matrix} | \\ (CR^1{}_2)_n \\ | \\ C-O^- \cdots M^{+v} \\ \| \\ O \end{matrix} \right]_v$$

wherein
R is individually in each occurrence hydrogen, an alkyl, ester, acetate, amide, nitrile, anhydride, or an aryl;

$R^1$ and $R^3$ are individually in each occurrence hydrogen, an alkyl, or an aryl;
$R^2$ is individually in each occurrence hydrogen, an alkyl, an aryl, or a pendant $-(CR^1{}_2)_nCO_2R^3$ group;
M is individually in each occurrence an alkali metal, alkaline earth metal, or a transition metal;
v is 1, 2, or 3 and represents the valency of M;
x is individually in each occurrence a variable integer from about 10 to about 40;
y is individually in each occurrence a variable integer from about 1 to about 10;
n is individually in each occurrence a variable integer from 0 to about 6.

3. The method of claim 2 wherein
R is individually in each occurrence hydrogen, an inertly substituted or unsubstituted $C_{1-18}$ alkyl, an inertly substituted or unsubstituted $C_{6-18}$ aryl, ester, nitrile, acetate, amide, or anhydride;
$R^1$ is individually in each occurrence hydrogen, an inertly substituted or unsubstituted $C_{1-18}$ alkyl, or an inertly substituted or unsubstituted $C_{6-18}$ aryl;
$R^2$ is individually in each occurrence hydrogen, an inertly substituted or unsubstituted $C_{1-18}$ alkyl, an inertly substituted or unsubstituted $C_{6-18}$ aryl, or a pendant $-(CR^1{}_2)_nCO_2R^3$ group;
$R^3$ is individually in each occurrence hydrogen, a $C_{1-8}$ alkyl, or a $C_{6-12}$ arylalkyl.

4. The method of claim 3 wherein
R is individually in each occurrence hydrogen, an inertly substituted or unsubstituted $C_{1-6}$ alkyl, or an inertly substituted or unsubstituted benzyl;
$R^1$ is individually in each occurrence hydrogen, methyl, ethyl, or an inertly substituted or unsubstituted benzyl;
$R^2$ is H.

5. The method of claim 4 wherein the metal cation is individually in each occurrence Na, Li, K, Rb, Cs, Fr, Be, Mg, Ca, Sr, Ba, Ra, Al, Cu, Zn, Cr, Mn, Fe, Co, Pb, or Ni.

6. The method of claim 5 wherein the amount of metal cation present in the membrane is from about 0.3 to about 40 wt%.

7. The method of claim 6 wherein the feed gas contains at least one of the gases chosen from the group of oxygen, nitrogen, methane, or carbon dioxide.

8. The method of claim 7 wherein the separation factor for oxygen/nitrogen is at least 3.0.

9. The method of claim 8 wherein the pressure differential across the membrane is between about 50 psi to about 250 psi.

10. The method of claim 9 wherein the temperature is between about 0 degrees C. to about 150 degrees C.

11. The method of claim 10 wherein the separation factor for carbon dioxide/methane is at least 6.0.

12. The method of claim 11 wherein the pressure differential across the membrane is at between about 50 psi to about 850 psi.

13. The method of claim 12 wherein the temperature is between about 0 degrees C. and about 150 degrees C.

* * * * *

UNITED STATES PATENT AND TRADEMARK OFFICE
CERTIFICATE OF CORRECTION

PATENT NO. : 4,789,386

DATED : December 6, 1988

INVENTOR(S) : Walter L. Vaughn; Marinda L. Wu

It is certified that error appears in the above-identified patent and that said Letters Patent is hereby corrected as shown below:

Col. 3, line 33, delete "Chd 1-10" and insert -- $C_{1-10}$ --;

Col. 8, line 50, "usually" has been misspelled.

Signed and Sealed this

Twenty-ninth Day of August, 1989

Attest:

DONALD J. QUIGG

Attesting Officer

Commissioner of Patents and Trademarks